3,236,666
TREATED CLAY SLURRIES
Edgar W. Sawyer, Jr., Metuchen, N.J., assignor to Minerals & Chemicals Philipp Corporation, Township of Woodbridge, N.J., a corporation of Maryland
No Drawing. Filed Feb. 18, 1964, Ser. No. 345,591
8 Claims. (Cl. 106—72)

This invention has to do with the treatment of aqueous kaolin clay slurries. The invention is particularly directed to the treatment of concentrated clay slurries which contain a condensed phosphate as a clay dispersant.

Kaolin clay is a white, finely divided hydrated aluminum silicate mineral that is widely used as a coating or filler material in the production of paper goods. For such use, the clay is frequently supplied commercially as a concentrated aqueous slurry containing about 70% clay solids (i.e., 70 parts by weight clay to 30 parts by weight of water). Alternatively, the clay is slurried at about 70% solids in a coating plant. In order to provide high solids clay slurries of sufficient fluidity to be pumped and to permit the formulation of high solids coating compositions, a clay dispersing agent, usually a soluble alkali metal salt of a condensed phosphate, must be incorporated into the clay slurry. The dispersed slurry is then mixed with adhesive solution to provide the coating composition, usually called a "coating color." When high solids slurries of kaolin clay are stored, the condensed phosphate clay dispersant frequently decreases in effectiveness, as evidenced by the fact that the viscosity of the slurry increases substantially. Thus, a 70% solids slurry of kaolin clay may be very fluid when freshly formulated but semisolid and nonpumpable after it has been stored for a month. The action of microorganisms in the slurry is believed to account for the reversion of the condensed phosphate dispersant to a lower phosphate (orthophosphate) which is not an effective clay dispersant. Slurries that are contaminated with small amounts of organic materials appear to be especially susceptible to viscosity buildup. These organic materials may be present, for example, as a result of clay processing.

Cationic germicides, especially certain water-soluble quaternary ammonium compounds, such as octadecyltrimethyl ammonium chloride and diisobutyl phenoxyethoxyethylbenzyl ammonium chloride, are extremely effective in controlling microorganisms in many aqueous systems. As compared with various germicides, they generally give much better control for a given dosage and their effect is usually more lasting. Such germicides, however, are not suitable for use with commercial clay slurries, especially concentrated condensed phosphate dispersed slurries, since such compounds interact with the clay in the slurry. As a result, the slurry thickens excessively and cannot be poured from its container or pumped in the coating plant.

Accordingly, an object of this invention is the provision of high solid dispersed kaolin slurries which have a reduced tendency to increase in viscosity when stored.

Another object of this invention is to reduce microorganisms in a high solids kaolin clay slurry to a negligible amount and to curtail the future growth of microorganisms therein without adversely affecting slurry viscosity, taste, color or odor.

Still another objective is to achieve the foregoing with a specific type of quaternary ammonium salt germicide.

Further objects and features of this invention will be apparent from the description thereof which follows.

Stated briefly, clay slurries of this invention comprise water, kaolin clay, a condensed phosphate dispersant and a small amount of a quaternary ammonium saccharinate having a solubility in water not to exceed 0.1% by weight and possessing germicidal properties.

An essential feature of this invention, therefore, resides in the use of a quaternary ammonium germicide in the form of the saccharinate salt. Another essential feature resides in the selection of a substantially water-insoluble quaternary ammonium saccharinate. Soluble quaternary saccharinates increase the viscosity of clay slurries, as do quaternary ammonium chlorides, bromides and the like. The soluble quaternary saccharinates and quaternary ammonium halides are, therefore, not suitable for purposes of this invention.

The quaternary ammonium saccharinates I use in putting this invention into practice are described in U.S. Patent No. 2,725,326 to William J. Shibe, Jr., et al. These salts are obtained by reacting 2,3-dihydro-3-oxobenziso-sulfonazole (saccharine) or its sodium salt with an aqueous solution of a high molecular weight quaternary ammonium halide of the general formula $R_4NX$, wherein X is a halogen, such as chlorine or bromine, and N is a pentavalent nitrogen atom to which is directly bonded hydrocarbon groups represented by $R_4$. The quaternary ammonium halide is selected to provide a quaternary ammonium saccharinate which has a solubility in water not to exceed 0.1% by weight at 25° C.; such saccharinates are referred to hereinafter as "insoluble" saccharinates. Species of insoluble quaternary ammonium saccharinates include alkyl dimethly benzyl ammonium saccharinate in which the alkyl group contains from 12 to 18 carbon atoms or mixtures thereof, e.g., lauryldimethyl benzyl ammonium saccharinate, soya dichlorobenzyl dimethyl ammonium saccharinate; ethoxylated quaternary saccharinates such as diisobutyl phenoxyethoxyethyl dimethyl ammonium saccharinate; also alkyl isoquinolinum saccharinates such as lauryl isoquinolinum saccharinate. Most alkyl trimethyl ammonium saccharinates are water soluble as a result of the presence of three lower alkyl groups. They are unsuitable for purposes of this invention since, as mentioned, the desired results required the selection of a quaternary ammonium saccharinate which is insoluble.

Insoluble quaternary ammonium saccharinates are extremely effective in controlling microorganisms in clay slurries and, even when employed in extremenly small amount (e.g., 200 parts per million), these saccharinates effectively sterilize the slurry and make it resistant for long periods of time to contamination by microorganisms introduced by external sources. When incorporated into condensed phosphate dispersed kaolin slurries, the insoluble saccharinates stabilize the viscosity of the slurries and minimize possible viscosity increase. A desirable feature of the insoluble saccharinate germicides is that they have high germicidal efficiency over a wide pH range, a property not possesed by many widely used quaternary ammonium germicides.

More specifically, the clay slurries to which this invention is directed contain at least 60% kaolin clay, weight basis, and frequently contain up to 72% clay solids. Some kaolin clays can be formulated into fluid slurries containing as much as 80% clay solids. Slurries within the scope of this invention also contain a clay dispersing agent, usually from 0.10% to 1.0% based on the weight of the clay solids, of an alkali metal salt of a condensed phosphate (e.g., sodium hexametaphosphate, sodium tripolyphosphates, tetrasodium pyrophosphate, sodium tetraphosphate and analogous potassium condensed phosphates). Frequently the slurries contain an alkali, usually sodium hydroxide, to increase the pH to a suitable value. The invention is of special benefit in treating dispersed high solids slurries of clay contaminated with small amounts of organic materials (e.g., fats, oils or higher fatty acids). These organic materials support the growth of microorganisms in aqueous media and condensed phosphate dispersed clay slurries containing organic contaminants may become very viscous in short periods of time.

The quantity of quaternary ammonium saccharinate I incorporate into these high solids clay slurries is generally within the range of about 0.005% to about 0.100% of the slurry weight, more usually within the range of 0.01% to 0.03% by weight. When used in amount considerably less than 0.005% by weight, the quantity of saccharinate may not be sufficient to obtain the desired results. The use of large quantities of saccharinate, e.g., more than 0.03% (300 parts per million), may be economically unfeasible. The saccharinate is incorporated into a slurry before the slurry undergoes substantial viscosity increase as a result of reversion of the condensed phosphate dispersant.

The following examples are given to illustrate this invention and to demonstrate certain advantages thereof.

The clay used in these examples was a spray dried, water-fractionated Georgia kaolin clay known as "Spray Satin." The clay, as supplied, contained 0.35% by weight of tetrasodium pyrophosphate clay dispersant. This clay was made into a 70% solids slurry by agitating 70 parts by weight of the spray dried clay with 30 parts by weight of distilled water.

*Example I*

In accordance with this invention, a small amount of cetyl pyridinium saccharinate (water solubility below 0.1%) was incorporated into a sample of the freshly prepared 70% solids slurry of kaolin clay containing condensed phosphate dispersant. For purposes of comparison, the same amount of cetyl pyridinium chloride, a quaternary ammonium germicide outside the scope of this invention, was incorporated into another sample of the dispersed clay slurry. In each case, germicide was incorporated in amount of 0.02% of the slurry weight (200 parts per million).

The rheological properties of the slurries were examined and compared with the rheological properties of the untreated slurry.

Viscosity measurements of germicide-treated slurries were made on slurries that had aged for a day after incorporation of germicide. The untreated slurry was also evaluated after aging for a day. Viscosity measurements were made at low shear rates and at high shear rates considered to be of significance in the formulation of kaolin coating colors and in the application of coating colors to paper. In measuring low shear viscosity, a Brookfield viscometer was used. This is a rotational viscometer, the operation of which is described in Kirk-Othmer's "Encyclopedia of Chemical Technology," vol. 14, pages 770 to 772. An appropriate spindle was used for each viscosity range measured. High shear viscosity was measured with the Hercules viscometer, a rotational viscometer which automatically traces a plot of torque versus rate of shear. Each slurry was mixed for 10 minutes with a propeller type mixer before Brookfield or Hercules viscosity evaluations were made. Results are summarized in Table I.

TABLE I.—EFFECT OF ADDITION OF CETYL PYRIDINIUM GERMICIDE SALTS ON VISCOSITY OF 70% SOLIDS KAOLIN CLAY SLURRY

| Germicide, Weight Percent Based on Total Slurry Weight | Low Shear Viscosity, Brookfield Viscosity [1] cp. at R.P.M. Shown | | | | High Shear Viscosity, Hercules Viscosity,[3] R.P.M./ Dyne-Cm.×10[5] |
|---|---|---|---|---|---|
| | 10 | 20 | 50 | 100 | |
| None | 600 | 425 | 290 | 225 | 330/16 |
| 0.02% cetyl pyridinium saccharinate | 1,000 | 700 | 460 | 350 | 260/16 |
| 0.02% cetyl pyridinium chloride | 6,200 | 5,400 | 2,880 | [2] 1,800 | 190/16 |

[1] #3 Spindle unless otherwise indicated.
[2] #5 Spindle.
[3] "A" bob at 30° C.

Data in Table I show that incorporation of cetyl pyridinium chloride into the clay slurry increased the viscosity of the slurry almost ten-fold at all shear rates examined with the Brookfield viscometer. In contrast, the same quantity of cetyl pyridinium saccharinate brought about a much smaller viscosity increase in the low shear viscosity of the clay slurry—in most instances only about a two-thirds increase. In effect, the slurry was about six times less viscous at low shear rates when the cetyl pyridinium germicide was used as the saccharinate rather than as the chloride.

Similar results were observed at high shear rates. Thus, when 0.02% cetyl pyridinium chloride germicide was incorporated into the slurry, the shear rate required to develop a torque of 16×10[5] dyne-cm. was only 57% of the shear rate required to develop this same torque with untreated clay. When the same amount of cetyl pyridinium salt was used as the insoluble saccharinate, in accordance with this invention, a torque of 16×10[5] dyne-cm. was developed at 78% of the shear rate of the untreated slurry, indicating that with cetyl pyridinium saccharinate the slurry was 20% less viscous at high shear rates than when the chloride salt was used.

These data, therefore, indicate that cetyl pyridinium saccharinate is a suitable germicidal additive for a high solids kaolin clay slurry whereas cetyl pyridinium chloride is not.

*Example II*

The procedure of Example I was repeated to compare the effect of lauryl dimethyl benzyl ammonium saccharinate, an insoluble saccharinate, with the corresponding chloride salt. The clay used was the same spray dried kaolin employed in Example I. As in the previous example, a freshly prepared 70% solids slurry was treated with germicide, aged for a day after incorporation of germicide and then evaluated. Results are summarized in Table II.

TABLE II.—EFFECT OF ADDITION OF LAURYL DIMETHYL BENZYL AMMONIUM GERMICIDE SALTS ON VISCOSITY OF 70% SOLIDS KAOLIN SLURRY

| Germicide, Weight Percent Based on Total Slurry Weight | Low Shear Viscosity, Brookfield Viscosity [1] cp. at R.P.M. Shown | | | | High Shear Viscosity, Hercules Viscosity,[3] R.P.M./ Dyne-Cm.×10[5] |
|---|---|---|---|---|---|
| | 10 | 20 | 50 | 100 | |
| None | 600 | 425 | 290 | 225 | 330/16 |
| 0.02% lauryl dimethyl benzyl ammonium saccharinate | 800 | 600 | 320 | 220 | 385/16 |
| 0.02% lauryl dimethyl benzyl ammonium chloride | 24,000 | 14,000 | 800 | [2] 5,200 | ([4]) |

[1] #3 Spindle.
[2] #7 Spindle.
[3] "A" bob at 30° C.
[4] Too thick to evaluate.

The results in Example II for lauryl dimethyl benzyl ammonium salts are generally similar to results for cetyl pyridinium salts although the desirable effect of using the saccharinate is more striking with the lauryl dimethyl benzyl ammonium salt. Thus, lauryl dimethyl benzyl ammonium chloride increased low shear viscosity about 40-fold and made the slurry too viscous to evaluate at high rates of shear whereas lauryl benzyl ammonium saccharinate actually reduced high shear viscosity and effected only a very modest increase in low shear viscosity of the clay slurry.

*Example III*

(a) The procedure of the previous examples was repeated using 0.02% lauryl isoquinolinium saccharinate as the slurry treating agent. Brookfield viscosity measurements were substantially the same as measurements made when 0.02% lauryl dimethyl ammonium saccharinate was employed.

(b) Various commonly used quaternary ammonium salt germicides outside the scope of this invention were incorporated into samples of the 70% solids clay slurry. With 0.02% lauryl trimethyl ammonium chloride addition, the 70% solids kaolin slurry was too thick to measure with the Hercules viscometer; Brookfield viscosity at 10, 20, 50 and 100 r.p.m. were 36,000 cp.; 24,000 cp.; 14,400 cp. and 10,400 cp., respectively—demonstrating the undesirable thickening effect of the cationic germicide. With 0.02% diisobutylphenoxyethoxyethyl benzyl ammonium chloride, the slurry was too viscous to measure with the Hercules instrument and, at all shear rates, Brookfield viscosity values were about twice the values obtained with 0.02% lauryl dimethyl benzyl ammonium saccharinate or 0.02% lauryl isoquinolinium saccharinate.

I claim:

1. A clay composition in the form of a flowable aqueous slurry and consisting essentially of water, from about 60 percent to 72 percent by weight of kaolin clay, an alkali metal salt of a condensed phosphate as a clay dispersing agent in amount from 0.10 percent to 1.0 percent, based on the weight of said clay, and from 0.005 percent to 0.100 percent by weight of a quaternary ammonium saccharinate having a water solubility not exceeding 0.1% by weight.

2. The composition of claim 1 in which said saccharinate is lauryl dimethyl benzyl ammonium saccharinate.

3. The composition of claim 1 in which said saccharinate is cetyl pyridinium saccharinate.

4. The composition of claim 1 in which said saccharinate is lauryl isoquinolinium saccharinate.

5. A clay composition in the form of a flowable aqueous slurry and consisting essentially of water, at least about 60% by weight kaolin clay, an alkali metal salt of a condensed phosphate as a clay dispersing agent in amount from 0.1 percent to 1.0 percent, based on the weight of said clay, and 0.01% to 0.03% by weight of a quaternary ammonium saccharinate having a water solubility not exceeding 0.1% by weight.

6. A viscosity stabilized clay composition in the form of a concentrated flowable aqueous slurry and consisting essentially of water, from about 60 percent to 72 percent by weight of kaolin clay containing a small amount of organic matter as an impurity, a polyphosphate clay dispersing agent in amount from 0.1 percent to 1.0 percent, based on the weight of said clay, and from about 0.005% to 0.100% by weight of a germicidal quaternary ammonium saccharinate having a water solubility not exceeding 0.1% by weight.

7. A method for stabilizing the viscosity of a fluid aqueous slurry consisting essentially of water, from about 60 percent to 72 percent by weight kaolin clay and a condensed phosphate dispersant in amount of about 0.10 percent to 1.0 percent, based on the weight of said clay, which comprises incorporating into said slurry from about 0.005 percent to 0.100 percent by weight of a quaternary ammonium saccharinate having a water solubility not exceeding 0.1% by weight.

8. A method for stabilizing the viscosity of a concentrated aqueous slurry of kaolin clay consisting essentially of water, from about 60 percent to 72 percent by weight kaolin clay and from about 0.10 percent to 1.0 percent based on the weight of said clay of an alkali metal salt of a condensed phosphate as a dispersing agent for said clay, which method comprises incorporating from about 0.005 percent to 0.100 percent by weight of a quaternary ammonium saccharinate having a water solubility not to exceed 0.1% by weight into said slurry substantially immediately after said slurry is prepared.

References Cited by the Examiner

UNITED STATES PATENTS

| | | | |
|---|---|---|---|
| 2,725,326 | 11/1955 | Shibe et al. | 167—33 |
| 3,093,603 | 6/1963 | Gilchrist | 106—15 |
| 3,130,063 | 4/1964 | Millman et al. | 106—72 |

TOBIAS E. LEVOW, *Primary Examiner.*

J. E. POER, *Assistant Examiner.*